United States Patent [19]
Gandhi et al.

[11] Patent Number: 5,588,692
[45] Date of Patent: Dec. 31, 1996

[54] PUSH-OUT VEHICLE SIDE DOOR

[75] Inventors: Umesh N. Gandhi, Grand Blanc; Douglas J. Osmak, Clarkston, both of Mich.

[73] Assignee: General Motors Corporation, Detroit, Mich.

[21] Appl. No.: 541,165

[22] Filed: Oct. 11, 1995

[51] Int. Cl.$^6$ .................................................. B60R 21/04
[52] U.S. Cl. .................. 296/146.7; 280/751; 296/146.6; 296/189
[58] Field of Search ..................................... 296/189, 188, 296/146.7, 146.6, 39.1; 280/748, 751; 49/502, 503; 293/132, 133

[56] References Cited

U.S. PATENT DOCUMENTS

| | | | |
|---|---|---|---|
| 3,582,134 | 6/1971 | Shaff | 296/146 |
| 3,791,693 | 2/1974 | Hellriegel et al. | 296/146 |
| 3,868,796 | 3/1975 | Bush | 52/618 |
| 3,964,208 | 6/1976 | Renner et al. | 49/502 |
| 3,989,275 | 11/1976 | Finch et al. | 280/751 |
| 4,272,103 | 6/1981 | Schmid et al. | 280/751 |
| 4,369,608 | 1/1983 | Miura et al. | 52/309.9 |
| 4,769,951 | 9/1988 | Kaaden | 49/502 |
| 4,786,100 | 11/1988 | Kleemann et al. | 296/146 |
| 5,000,509 | 3/1991 | Sinnhuber et al. | 296/188 |
| 5,040,335 | 8/1991 | Grimes | 49/502 |
| 5,048,234 | 9/1991 | Lau et al. | 49/502 |
| 5,066,064 | 11/1991 | Garnweidner | 296/146 |
| 5,102,163 | 4/1992 | Ishikawa | 280/751 |
| 5,110,176 | 5/1992 | Curtis | 296/188 |
| 5,117,549 | 6/1992 | Gaudreau | 29/458 |
| 5,169,204 | 12/1992 | Kelman | 296/146 D |
| 5,277,441 | 1/1994 | Sinnhuber | 280/730 R |
| 5,306,066 | 4/1994 | Saathoff | 296/146.6 |
| 5,328,234 | 7/1994 | Daniel et al. | 297/216.16 |
| 5,395,135 | 3/1995 | Lim et al. | 280/751 |
| 5,421,925 | 6/1995 | Kulaszewicz et al. | 156/73.5 |
| 5,437,753 | 8/1995 | Ugolini | 156/214 |
| 5,482,344 | 1/1996 | Walker et al. | 296/39.1 |

FOREIGN PATENT DOCUMENTS

| | | |
|---|---|---|
| 4228626A1 | 3/1994 | Germany . |
| 4338249 | 5/1994 | Germany ............................ 296/146.6 |
| 4-362415 | 12/1992 | Japan . |
| 6-270681 | 9/1994 | Japan . |
| 1441598 | 7/1976 | United Kingdom . |
| 2271534 | 4/1994 | United Kingdom . |

Primary Examiner—David M. Mitchell
Assistant Examiner—Kia M. Robinson
Attorney, Agent, or Firm—Ernest E. Helms

[57] ABSTRACT

An automotive vehicle door is provided including a first generally rigid outer structure having first and second ends; a second generally rigid inner structure with a major portion spaced from the first outer structure, the second inner structure having first and second ends generally positionally aligned with the first and second ends of the first outer structure, the second inner structure having an opening; a trim panel positioned generally adjacent the second inner structure; a target position in alignment with the opening of the second inner structure adjacent a first end of the second inner structure, the target also having a portion adjacent the first outer structure; and a beam having a first end generally fixed with respect to the second inner structure first end and a second end fixed with respect to the second inner structure second end, the beam crossing over the target and wherein an impact on the door first outer structure causes the target to move inwardly through the opening, contacting the beam between the beam first and second ends to force the beam second end to dislodge the trim panel from the second inner panel end and move the trim panel inwardly.

10 Claims, 2 Drawing Sheets

PUSH-OUT VEHICLE SIDE DOOR

FIELD OF THE INVENTION

The field of the present invention is that of apparatuses and methods of utilization thereof of vehicle side doors.

BACKGROUND OF THE INVENTION

Beyond the utilization of side impact beams, there have been various other approaches utilized to aid in the mitigation of possible injury to vehicle occupants in side impacts. One method is to increase the padding material inside the vehicle. Interior padding on the vehicle door is limited since increasing the interior padding on the door also diminishes the interior space available within the vehicle.

Another method is to provide a honeycomb structure between inner and outer panels of the vehicle. This structure is disadvantageous because it greatly adds complexity to manufacturing, often requiring many more welds. Additionally, such structures can substantially increase the weight of the door. The weight of the door works to diminish the environmental efficiency of the vehicle.

Another technique to protect the vehicle occupant is to add an energy-absorbing material between the inner and outer door structures. This technique is limited by the amount of space between the inner and outer panels, and it is often not sufficient to place the amount of energy-absorbing material as desired. Also, if the energy-absorbing material placement arrangement between the inner and outer door structures is incorrectly designed, the arrangement may even further contribute to increased injury to the vehicle occupant.

It is desirable to improve upon the above-mentioned three techniques of passenger protection while at the same time minimizing vehicle weight and manufacturing complexity.

SUMMARY OF THE INVENTION

Gandhi et al, U.S. Ser. No. 08/353,761, commonly assigned, provides an alternative to the three above-mentioned techniques by providing a vehicle door with rigid inner and outer panel structures. The inner panel structure has an opening. Suspended between the inner and outer panels adjacent to the opening in the inner panel, in a preferred embodiment, is a compliant target. Upon a side impact of the vehicle door, the target will protrude through the opening in the inner panel, ideally contacting a seated vehicle occupant in the pelvic region (via a more compliant door trim panel), thereby directing the initial impact on the vehicle occupant to the portion of the body most capable of sustaining the impact without serious injury and thereafter causing the vehicle occupant to be further away from the door as the door crumbles because of the side impact on the vehicle.

The present invention provides a vehicle door which can provide a technique similar to that described in Gandhi et al but being more suitable for front vehicle doors with fully extendable and retractable windows.

DESCRIPTION OF THE PREFERRED EMBODIMENT

Figures 1, 2:
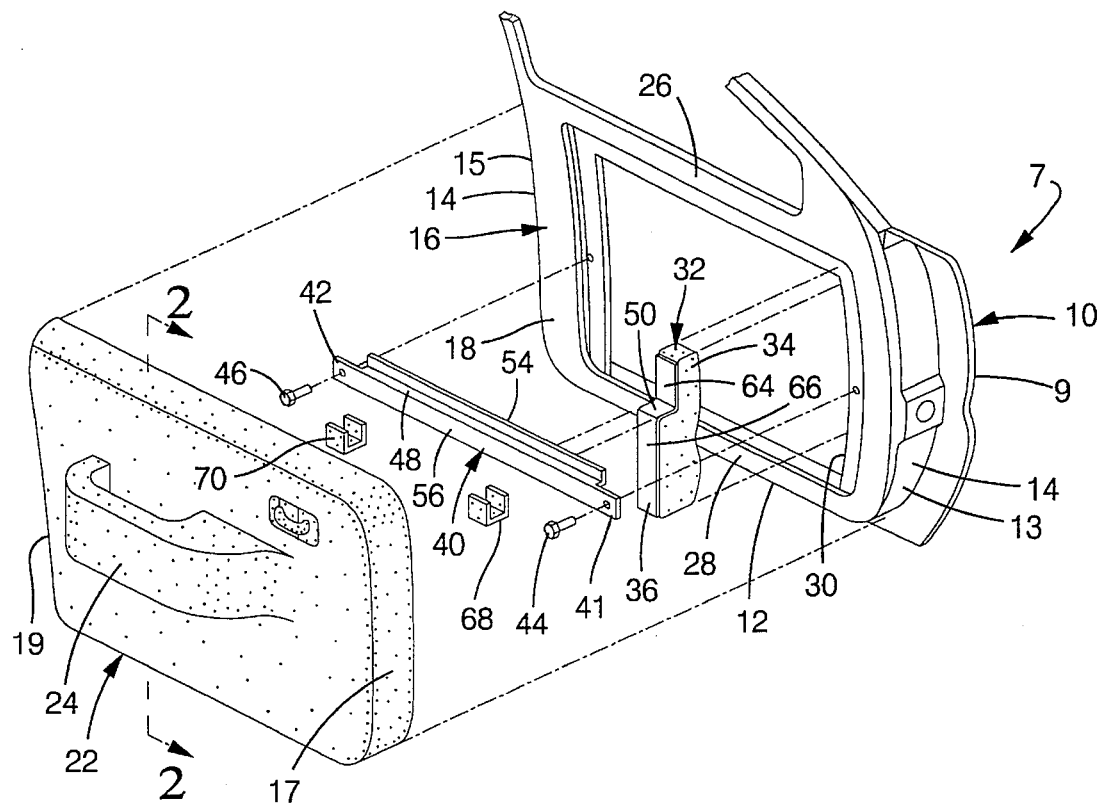
FIG. 1 is an exploded perspective view of a left hand front door according to the present invention with a door window and the door window regulator hardware removed for clarity of illustration.
FIG. 2 is a view taken along line 2—2 of FIG. 1 with the parts assembled.
Figure 3:
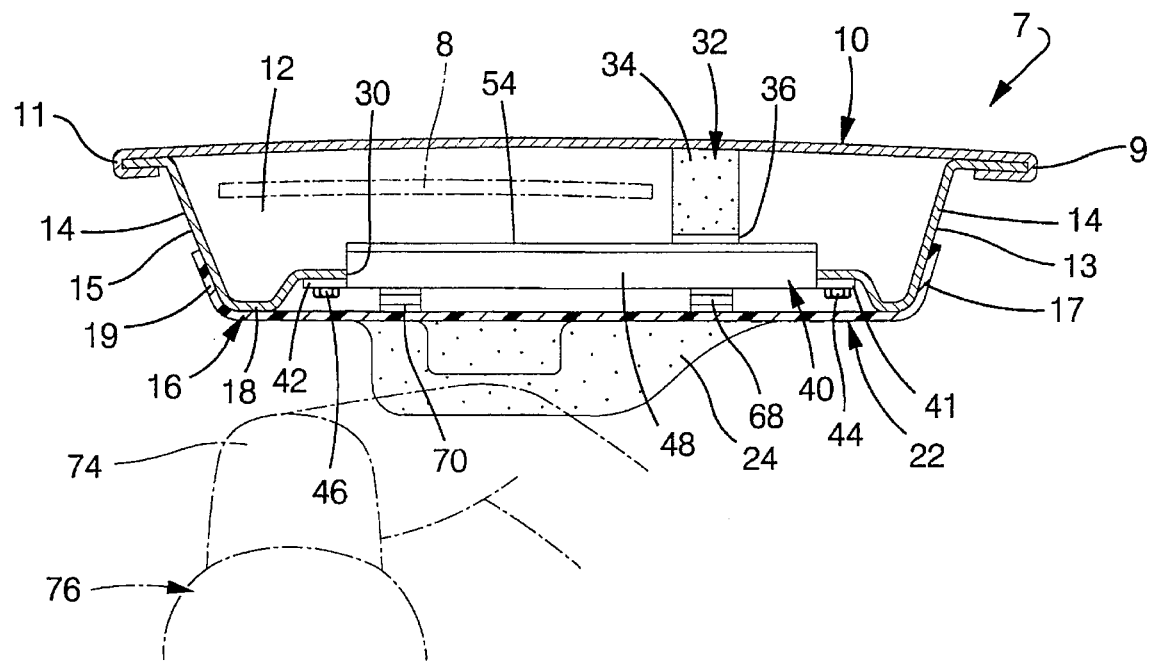
FIG. 3 is a view taken along line 3—3 of FIG. 2.
Figure 4:
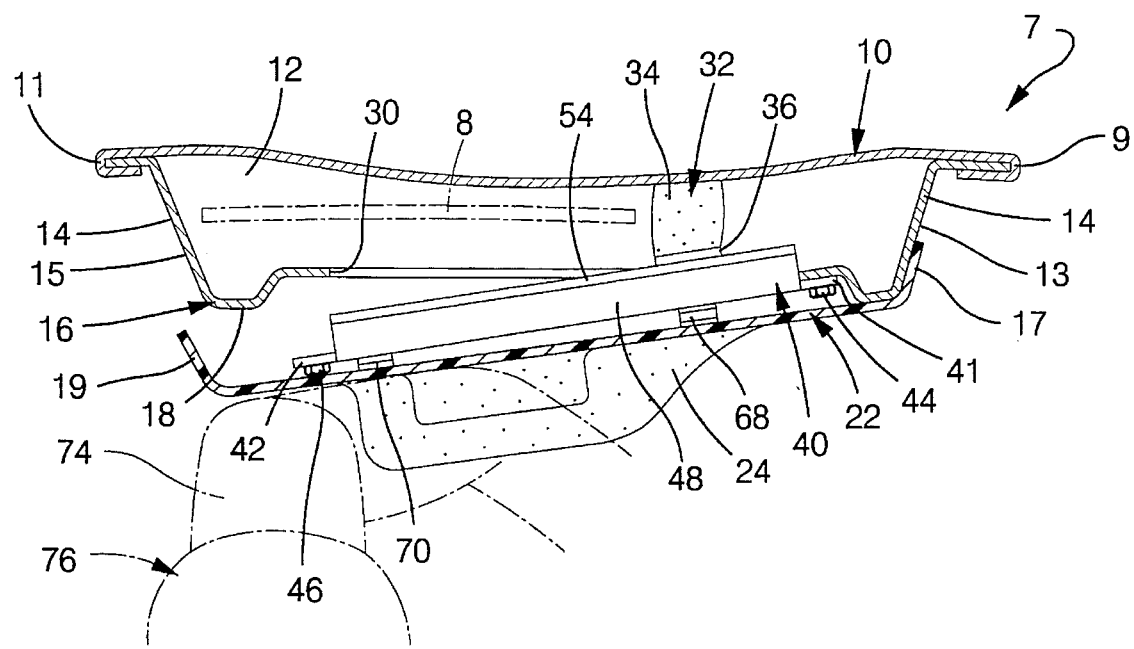
FIG. 4 is a view similar to that of FIG. 3 illustrating operation of the vehicle door during a side impact showing dislodgment of a rearward second end of the interior trim panel from the door inner structural member.

Referring to FIGS. 1 through 4, the door 7 has a typical rigid steel, plastic or fiberglass outer door structure panel 10. Joined to the outer door panel 10 by a floor 12 and side panels 14 is an inner door structure 16, which is also rigid. Typically, the floor 12, side panels 14 and inner panel 16 will be fabricated from a common stamping, sometimes referred to in the industry as the "door inner." A major portion if not all of the inner panel 16 is spaced from the outer panel 10 and forms a cavity therebetween for a retractable window 8 (only partially shown in phantom). The inner panel 16 is principally comprised of two members, an outer peripheral member 18 and a module hardware member (not shown) which includes a window regulator mechanism. The module hardware member will extend within an opening 30 of the inner panel 16 and will be attached to the outer peripheral member 18.

The vehicle door 7 has an ornamental interior trim panel 22 which is typically made from a generally rigid foam polyurethane material covered with an appropriate vinyl or cloth membrane skin. The interior trim panel 22 preferably has a crushable arm rest portion 24. The interior trim panel 22 will typically be connected to the inner door structure 16 by appropriate fasteners (not shown) somewhere along its top end 26 and along its bottom end 28.

The door outer panel 10 along a forward end of the vehicle has a first end 9 and an opposite rearward end 11. In like manner, the inner panel 16 has a first end 13 and a second end 15 generally aligned with the first and second ends 9, 11 of the outer door panel. In a similar manner, the trim panel 22 has first and second ends 17 and 19.

Aligned with the opening 30 of the inner door panel is a target 32. Target 32 is juxtaposed between a forward end of the window 8 and a first end 13 of the inner door panel. Target 32 has a first portion 34 which is adjacent the outer door panel and is typically contoured to match therewith. Target 32 also has a brace 36, typically metallic or a rigid plastic, which is much less compressible than the polymeric elastopolypropylene foam having a density of 2.5 lb/cu ft of the portion 34.

Crossing over the target 32 and the opening 30 is a beam 40. The beam 40 has a first end 41 which is joined to the first end 13 of the inner door panel, and beam 40 has a second end 42 fixably joined to the second end 15 of the inner door panel. The beam 40 is fixed in position with respect to the inner panel 16 by virtue of threaded fasteners 44 and 46. Typically, the fastener 46 will be sized to break away at a much lower force (500 N load) than the fastener 44. Fastener 44 is designed not to break for at least a 5000 N load.

The beam has a contour providing a flat portion 48 which sets upon a flat 50 of 36 of the target. The beam also has vertical legs 54 and 56 which in like manner match the contour of the vertical legs 64 and 66 of the target.

The beam 40 is also fixably connected to the trim panel 22 by two U-shaped compressible or compliable brackets 68 and 70. The brackets 68, 70 will be attached to the trim panel 22 and to the beam 40 by appropriate fasteners or adhesive techniques.

The operation of the door structure in a side impact will be as follows. Upon an object hitting the side of the door, the target 32 will be thrust inwardly. The inward thrust of the target 32 and by virtue of its placement will cause the bracket 36 to push on the beam 40 and cause the beam 40 to act as a lever bar with the pivoting end of the lever being at fastener 44 and the end of lever being the second end 42 of the beam. Second end 42 will be allowed to break away from the door inner panel 16 by virtue of the fracture of bolt 46. This will cause the interior trim panel second end 19 to dislodge and hopefully hit a shoulder region 74 of a seated occupant 76.

The injury to the occupant during side impact mainly results from interaction between the occupant and the interior of the vehicle. The separation of the interior trim panel 22 from the door inner panel 16 results in altering the interior such that occupant protection is improved. As a result of the separation, the available crush space is increased, and the compliance of the interior as seen by the occupant is also improved. Also, as the interior trim panel is moved closer to the occupant, the occupant is loaded early in the crash event. This results in interaction load between the interior trim panel and the occupant for spread over a longer period, i.e., lower magnitude for the peak load and hence lower occupant injury.

The interior compliance as seen by the occupant is a result of crush characteristics of the target 32 in pushing the beam 40, the crush characteristics of the brackets 68 and 70, the bending stiffness of the interior trim, and the bending stiffness of the beam 40. The interior stiffness can be customized by designing different cross sections of the beam 40 and selecting different materials (foam) for the target.

Essentially, this invention is helpful in bringing the benefit of the target 32 (foam) packaged at a location which is away from the occupant to a location which is closer to the occupant. This is a very important advantage as there is not sufficient space to locate the target 32 near the occupant. Also, the interior trim panel tends to keep the occupant away from the more rigid portions of the door — the interior trim panel 16 and the exterior trim panel 10. Additional spacing is now ensured between the shoulder 74 and the torso region of the seated occupant 76 and the aforementioned rigid panel members 16 and 10 of the door.

Preliminary empirical evidence has revealed that the present invention provides improvements in occupant protection during side impacts per Federal Motor Vehicle Safety Standard 214. It has been found that loads to the pelvic area have been lowered and thoracic trauma has been lowered.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. An automotive vehicle door comprising:

a first generally rigid outer structure having first and second ends;

a second generally rigid inner structure with a major portion spaced from the first outer structure, the second inner structure having first and second ends generally positionally aligned with the first and second ends of the first outer structure, the second inner structure having an opening;

a trim panel positioned generally adjacent the second inner structure;

a target positioned in alignment with the opening of the second inner structure adjacent the first end of the second inner structure, the target also having a portion adjacent the first outer structure; and a beam having a first end generally fixed with respect to the second inner structure first end and a second end fixed with respect to the second inner structure second end, the beam crossing over the target straddling and a portion of the opening of the rigid inner structure and wherein an impact on the door first outer structure causes the target to move inwardly through the opening, contacting the beam between the beam first and second ends to force the beam second end to dislodge the trim panel from the second inner panel end and move the trim panel inwardly.

2. An automotive vehicle door as described in claim 1 wherein the beam is directly connected to the second inner structure.

3. An automotive vehicle door as described in claim 1 wherein the beam is directly connected to the trim panel.

4. An automotive vehicle door as described in claim 2 wherein the beam is directly connected to the trim panel.

5. An automotive vehicle door as described in claim 3 wherein a compressible bracket connects the beam to the trim panel.

6. An automotive vehicle door as described in claim 1 wherein the target is a composite with a first semicompressible portion braced by a rigid, generally noncompressible portion.

7. An automotive vehicle door as described in claim 6 wherein the generally non compressible portion brace on the target is aligned with a cross-sectional contour of the beam.

8. An automotive vehicle door as described in claim 1 wherein the target is positioned between the first end of the door beam and a retractable window contained within a cavity formed between the first outer structure and the second inner structure.

9. An automotive vehicle door comprising:

a first generally rigid outer structure having first and second ends;

a second generally rigid inner structure with a major portion spaced from the first outer structure, the second inner structure having first and second ends and an opening therebetween;

an extendable window positioned in a cavity formed between the first outer structure and the second inner structure;

an interior trim panel with first and second ends connected to and generally aligned with the first and second ends of the second inner structure;

a target positioned in alignment with the opening of the second inner structure juxtaposed between the first end of the second inner structure and the extendable window, the target also having a portion adjacent the first outer structure; and a beam having a first end and a second end connected to the first and second ends of the second inner structure and the beam being connected to the interior trim panel, the beam crossing over the target and wherein an impact on the door causes the target to move inwardly through the opening in the second inner structure, contacting the beam between the beam first and second ends to force the beam second end to dislodge from the second inner structure and to dislodge the trim panel from the second inner structure and move inwardly.

10. An automotive vehicle door comprising:

a first generally rigid outer structure having first and second ends;

a second generally rigid inner structure with a major portion spaced from the first outer structure, the second inner structure having first and second ends generally positionally aligned with the first and second ends of the first outer structure, the second inner structure having an opening;

a trim panel positioned generally adjacent the second inner structure;

a target positioned in alignment with the opening of the second inner structure adjacent the first end of the second inner structure, the target also having a portion adjacent the first outer structure; and a beam having a first end generally fixed with respect to the second inner structure first end and a second end fixed with respect to the second inner structure second end, the beam being directly connected to the trim panel and crossing over the target and wherein an impact on the door first outer structure causes the target to move inwardly through the opening, contacting the beam between the beam first and second ends to force the beam second end to dislodge the trim panel from the second inner panel end and move the trim panel inwardly.

* * * * *